United States Patent [19]

Peterson

[11] 4,333,725

[45] Jun. 8, 1982

[54] COMPRESSION STRESSED WELD JOINTS ON OFFSHORE PLATFORMS

[75] Inventor: Marvin L. Peterson, Ponca City, Okla.

[73] Assignee: Conoco Inc., Ponca City, Okla.

[21] Appl. No.: 912,164

[22] Filed: Jun. 2, 1978

Related U.S. Application Data

[63] Continuation of Ser. No. 790,504, Apr. 25, 1977, abandoned.

[51] Int. Cl.³ .............................................. F16B 11/00
[52] U.S. Cl. ................................... 403/271; 403/258; 228/139; 405/211
[58] Field of Search ............... 285/191, 286; 182/228; 403/167, 168, 255, 258, 260, 266, 271, 272, 234; 405/211; 211/182; 228/139, 140; 52/223 R

[56] References Cited

U.S. PATENT DOCUMENTS

| | | | |
|---|---|---|---|
| 2,557,766 | 6/1951 | Ronfeldt | 403/237 |
| 3,270,906 | 9/1966 | Christensen | 403/272 |
| 3,867,048 | 2/1975 | Endzweig | 403/252 |

FOREIGN PATENT DOCUMENTS

| | | | |
|---|---|---|---|
| 671993 | 9/1929 | France | 403/234 |
| 1564531 | 3/1969 | France | 403/255 |
| 2278906 | 2/1976 | France | 182/228 |
| 172311 | 10/1934 | Switzerland | 403/234 |
| 448527 | 6/1936 | United Kingdom | 403/234 |

Primary Examiner—Andrew V. Kundrat
Attorney, Agent, or Firm—A. Joe Reinert

[57] ABSTRACT

The strength of a weld joint joining the end of a first structural member to a second structural member wherein at least a portion of the weld joint is subject to cyclic tensioning stress is improved by applying a compressive stress load to the weld joint. An advantageous application is to the weld joints joining tubular members of offshore platforms.

9 Claims, 3 Drawing Figures

COMPRESSION STRESSED WELD JOINTS ON OFFSHORE PLATFORMS

This is a continuation of application Ser. No. 790,504, filed Apr. 25, 1977 and now abandoned.

BACKGROUND OF THE INVENTION

The invention relates to weld joints joining tubular structural members.

In an important application, the invention relates to fabrication of offshore platforms employed to drill for or to produce oil or gas.

BRIEF DESCRIPTION OF THE PRIOR ART

Offshore production and drilling platforms are an important aspect of fulfilling the energy needs of the nation and the world. Structures fabricated from tubular sections are being used in increasingly deep and hostile ocean environments with greater loads, more complex designs, and increased reliability requirements. The service requirements of these structures can be most severe. To illustrate, structures are now being planned or constructed for waters of 900 feet or more in depth. Though such platforms remain in many instances the most practical way of recovering hydrocarbons from such depths, such great depths and turbulent environmental conditions combine to push the technology of platform construction to approach the state of the art of the metallurgy, fabrication capability, and designs involved.

Such offshore steel structures are essentially an assemblage of tubes arranged to make a structural framework to support equipment and facilitates safely above the ocean surface. The tubes are normally joined by welding. Failures, although quite rare, virtually always occur at or near the welded joints.

One method to overcome the possibility of failure of the structure at or near the welded joints is to increase the wall thickness of the tubing employed. Also, larger sizes of platform members are employed. However, this has a counter-productive effect in that if one member is made heavier or larger, other members must also be made heavier or larger to support the additional weight and volume of the enlarged member and environmental forces or loads are greater for the enlarged members.

Proper design using the minimum safe structural members requires detailed computer stress analysis of each joint which significantly increases engineering and design effort and cost. Even so, such detailed design analysis is necessary in order to cut down on the weight and volume of each member, and its multiplying effect on increasing weight throughout the structure.

A considerable need exists for strengthened tubular joints. If less massive members can be used at the joint, there is not only a savings at this point but also throughout the structure because less mass needs to be supported.

This invention constitutes a considerable advance in the art and results in very substantial savings in weight and expense in offshore platforms and the like by providing for loading of critical welds in compression stress which greatly increases their resistance to tension stress by redistributing the applied stress.

OBJECTS OF THE INVENTION

An object of the invention is to improve the strength of a weld joint joining the end of a first elongated structural member to a second structural member by applying compressive load to the weld joint sufficient to place the weld joint in compressive stress.

According to one aspect, an object of the invention is to improve the strength of weld joints joining tubular members of offshore platforms, wherein the weld joints are subject to cyclic tensioning stress, by providing for application of compressive stress to the weld joints.

SUMMARY OF THE INVENTION

A process and apparatus are provided for improving the strength of a weld joint joining the end of a first elongated structural member to a second structural member wherein at least a portion of the weld is subject to cyclic tensioning stress, wherein the method and apparatus apply a compressive load to the weld joint sufficient to place the weld joint in compressive stress.

In one aspect, a weld joint (which joins a first tubular structural member of an offshore platform to a second tubular structural member of the offshore platform and is subject to cyclic tensioning stress by environmental forces applied to the offshore structure) is placed in compressive load by a tensioning means to improve its strength and resistance to fatigue. In one more particular aspect, the tensioning means applies sufficient compressive load to exceed any tension stress that the environmental action on the structure will impart to the weld joint, and thus the weld joint is subjected only to varying amounts of compression stress.

DESCRIPTION OF THE DRAWINGS

Figure 1:
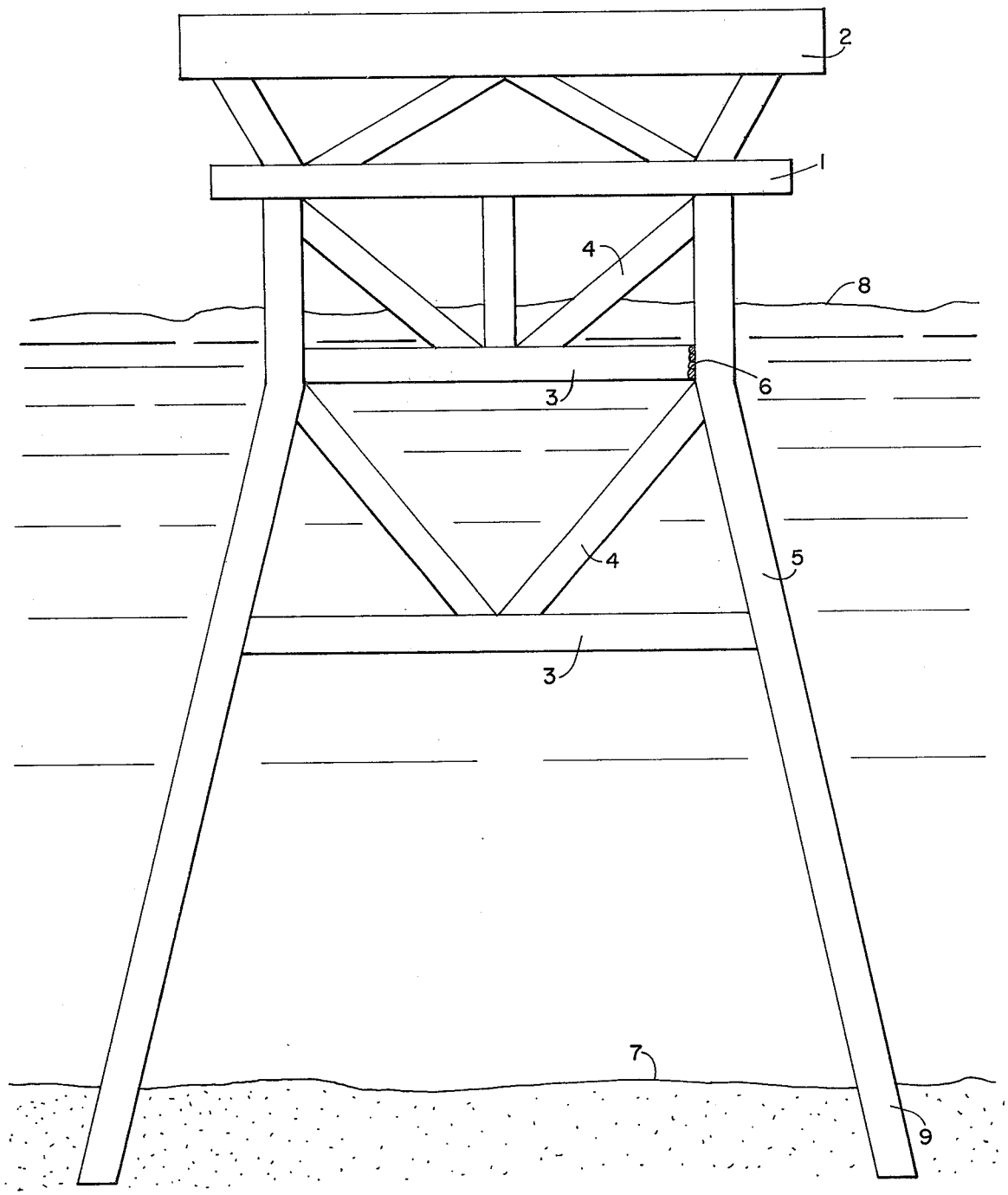
FIG. 1 is a schematic cross section of an offshore platform showing members joined by weld joints.

FIG. 1 illustrates a cross sectional schematic view of an offshore platform comprised of tubular members joined by weld joints.

The platform 1 rests upon and is affixed to seafloor 7 with pilings 9 and has its major portion submerged below the water level 8. It is comprised of various members including deck member 2, leg member 5, horizontal bracing members 3, and angle bracing members 4 which are joined by weld joints exemplified by weld joint 6.

Figure 2:
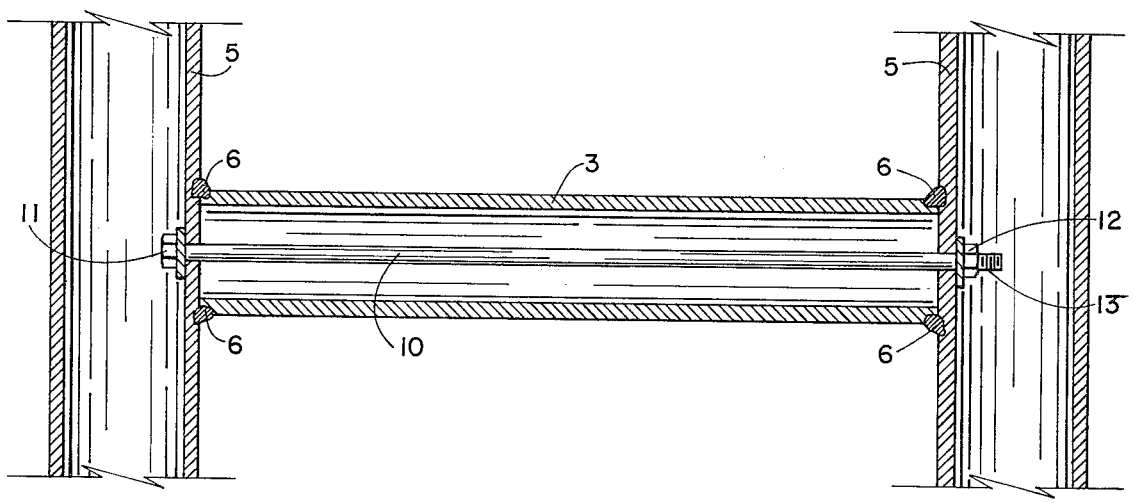
FIG. 2 illustrates a cross sectional view of the weld joints joining a horizontal member to two vertical members and held in compression stress by a tensioning means.

FIG. 2 illustrates a cutaway side cross sectional view of a tensioning device of the invention 10 providing compressive stress on weld joints 6 joining upright members 5 with horizontal bracing member 3. The tensioning device 10 comprises a bolt passing through a hole situated in upright member 5 and having a head 11 on one end and a threaded nut 12 on the other end which passes through a hole in the other upright member 5 and which provides compression stress on welds 6 by tightening nut 12 on threaded portion 13 of the tensioning bolt.

Figure 3:
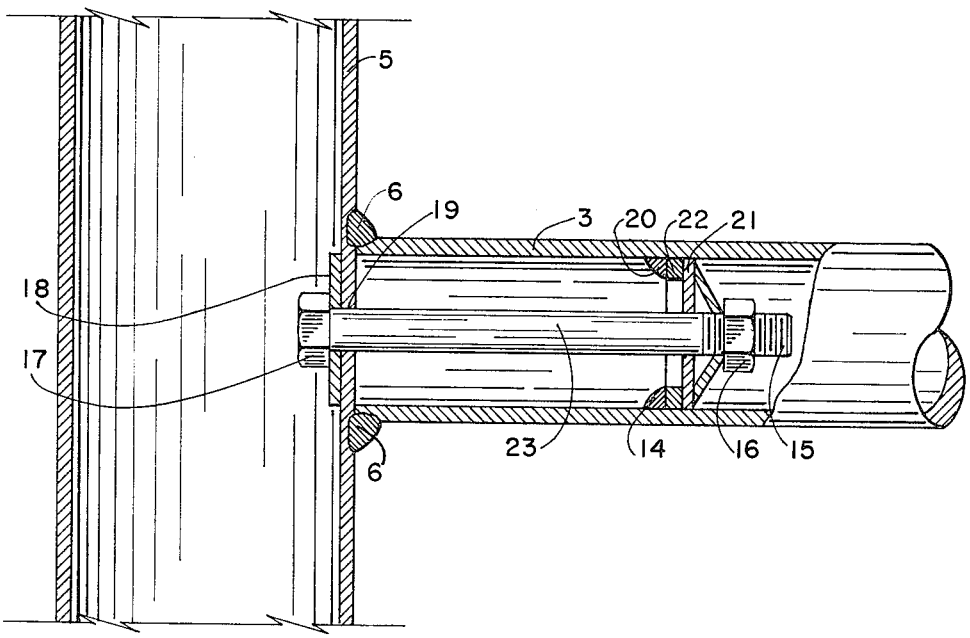
FIG. 3 shows a cross sectional view of an embodiment wherein a weld joint joins a horizontal member to a vertical member and is held in compressive stress by a tensioning means.

FIG. 3 illustrates a cross sectional view of another embodiment.

Horizontal bracing member 3 is joined to upright tubular member 5 by a weld 6. A hole 19 penetrates upright member 5 through which passes bolt 23 having head 17 and separated therefrom by retaining plate 18. Retaining ring 22 is affixed within the interior of tubular member 3 by weld 20 and provides an abutment for compression tension applied by tightening nut 16 on threads 15 against spring washer 14 and retaining plate 21.

PREFERRED EMBODIMENTS OF THE INVENTION

In the fabrication of offshore structures and the like, tubular joints are normally fabricated from tubes and are joined by welding. According to my invention, a compression load on the weld joint is imparted by employing a tensioning means such as has been shown in the figures. Appropriate retaining members inside the bracing members can be employed as shown in FIG. 3. Spring washers and other tension devices can also be used where appropriate. Tension can be supplied by mechanical or hydraulic tensioning means.

The space surrounding the tensioning means may be filled by a protective material to prevent seawater deterioration. Such protective material can be concrete, an inert gas such as nitrogen, helium, or the like, or can be organic polymer potting materials, oily or paraffinic materials, bitumen, and the like.

According to another embodiment of the invention, a tendon such as a band or cable of an organic polymer which has been oriented by stretching can be affixed to the members at appropriate sites, and after installation can be tensioned by release of some of the orientation by heating, such as by passing a hot fluid in contact with it. Some suitable organic polymers include polyethylene, nylons, and the like.

By way of further exemplifying and describing the invention and to provide information to those skilled in the art on how to carry it out, the following example problem solution and equation development is provided. However, it is to be understood that such is not to function as any limitation on the invention as described and claimed in the entirety of this application in view of the state of the art.

EXAMPLE PROBLEM SOLUTION—EQUATION DEVELOPMENT

When considering a preloaded joint, a part of the total load is carried by the tension member and a part of the load is carried by the brace member. In finding the portion of the load carried by each member it is convenient to determine the spring constant "K" of each part. The spring constant is a measure of the force required to give a unit deformation.

The equation for axial deformation $\delta = PL/AE$ where
$\delta$ = deformation
P = load
L = length in the direct of the force
A = area
E = modulus of elasticity
When $\delta = 1$, P = K; the spring constant of the tension member becomes $$K_t = A_T E_t / L_T$$

and for the brace $$K_B = A_B E_B / L_B$$

where T refers to the tension member and B refers to the brace member.

Let $P_T$ be the portion of the load carried by the tension member and $P_B$ be the load carried by the brace.

Because of the arrangement, the deformations will be assumed to be equal and the following equation can be written $$P_T/K_T = P_B/K_B$$

Substitution of $P - P_T = P_B$ gives $$P_T = (K_T/(K_B + K_T)) P$$

and $$P_B = (K_B/(K_B + K_T)) P$$

where $P_T$ is the load carried by the tension member and $P_B$ is the load carried by the brace.

If the tension member is pretensioned by an amount Po the total tension is $$P_T = [K_T/(K_T + K_B)]P + P_o$$

The resultant load on the brace is $$P_B = (K_B/(K_B + K_T)) P - P_o$$

EXAMPLE

Assume no deformation other than in the load direction of the brace and tension member.

Assume 14" O. D.×0.375 brace loaded to a non-steady normal stress of ±20,000 lbs/in² Area of brace = 16.05 sq.in.; Total load on brace from non-steady normal load is 16.05 in² × 20,000 lbs/in² = ±321,000 lbs.

If we use a 2.75" effective dia (5.93 in²) tensile member with a preload of 350,000 lbs the following stress results in the brace and the tensile member.

$$P_T = \left[ \frac{K_T}{K_B + K_T} \right] P + P_o$$

$$= \left[ \frac{5.93}{16.05 + 5.93} \right] (\pm 321{,}000 \text{ lbs}) + 350{,}000 \text{ lb}$$

$$P_T = \pm 86{,}602 + 350{,}000 = +436{,}602, \text{ lbs}$$

$$= +263{,}398 \text{ lbs}$$

This gives a stress value of max stress
+73,626 lbs/in²
min stress +44,417 lbs/in²
This is on an alternating load 59,021±14,604 lbs/in²
Similarly for the brace, $$P_B = \left[ \frac{K_B}{K_B + K_T} \right] P - P_o$$

$$= \left[ \frac{16.05}{16.05 + 5.93} \right] (+321{,}000) - 350{,}000$$

$$P_B = +234{,}397 - 350{,}000 \text{ lbs.}$$

$$= -584{,}395 - 115{,}603 \text{ lbs.}$$

Dividing by the area of the brace (16.05 sq. in.)
−36,411 lbs/in$^2$
−7,202 lbs/in$^2$ The resulting load in the brace is −21,807±14,604 lbs/in$^2$.

This example demonstrates how the mean stress and the stress range can be changed as a result of the application of a pre-load applied to the joint.

I claim:

1. In a weld joint joining in fluid-tight relationship the end of a first elongated hollow tubular structural member to the side of a second elongated tubular structural member wherein at least a portion of the weld joint is subject to cyclic tension and stress, the improvement comprising: means for applying a compressive load to the weld joint subsequent to solidification of the weld joint sufficient to place the weld joint in compressive stress, the means for applying compressive load being internal in the hollow tubular members, the external environment being a corroding marine environment, and the interior of the hollow tubular structural members being additionally protected from the external environment by filling with concrete, an inert gas, or organic polymer, a potting material, an oily material, a paraffinic material, or bitumen.

2. The improvement of claim 1 wherein the first elongated structural member is welded at a substantially right angle to the second tubular member, and wherein the structure is an offshore platform.

3. The apparatus of claim 2 wherein a tensioning member is affixed to the second structural member adjacent to the weld joint and to the first elongated member at a point along its elongated length.

4. The improved apparatus of claim 3 wherein the tensioning member is a bolt which passes through a hole in the second tubular structural member which is centered in the circular weld pattern joining the end of the first tubular structural member thereto and through a hole in a retaining ring affixed within the length of the first tubular structural member.

5. A method of improving the strength of a weld joint joining in fluid-tight relationship the end of a first elongated hollow tubular structural member to the side of a second elongated hollow tubular structural member wherein at least a portion of the weld joint is subjected to cyclic tension and stress; comprising applying subsequent to solidification of the weld joint by means of tensioning a tensioning member internal in the hollow tubular members a compressive load to the weld joint sufficient to place the weld joint in compressive stress, and the external environment being a corroding marine environment and the interior of the hollow tubular structural members being additionally protected from the external environment by filling with concrete, an inert gas, an organic polymer, a potting material, an oily material, a paraffinic material, or bitumen.

6. The method of claim 5 wherein the compressive load which is applied is sufficient that the weld joint is under sufficient compressive stress to exceed any tension stress that environmental action on the structures that the members are a part of will impart to the weld joint.

7. The method of claim 6 wherein the first elongated tubular structural member is welded at a substantially right angle to the second elongated tubular structural member.

8. The method of claim 7 wherein the structure is an offshore platform, wherein the compressive load is applied by affixing a tensioning member to the second structural member adjacent to the weld joint and in the first elongated structural member at a point along its elongated length and then tensioning the tensioning member.

9. The method of claim 8 wherein the tensioning member is a bolt having a nut for tensioning which passes through a hole in the tubular structural member which is centered in the circular weld pattern joining the end of the first tubular structural member thereto and through a hole in a retaining ring affixed within the length of the first tubular structural member.

* * * * *